US006113734A

United States Patent [19]

Woo et al.

[11] Patent Number: 6,113,734
[45] Date of Patent: Sep. 5, 2000

[54] APPARATUS FOR OPENING/CLOSING A PROCESS CHAMBER DOOR OF OVENS USED FOR MANUFACTURING SEMICONDUCTOR DEVICES

[75] Inventors: Jae-young Woo; Woo-yeul Choi, both of Suwon, Rep. of Korea

[73] Assignee: Samsung Electronics Co., Ltd., Suwon, Rep. of Korea

[21] Appl. No.: 08/996,094

[22] Filed: Dec. 22, 1997

[30] Foreign Application Priority Data

Jan. 9, 1997 [KR] Rep. of Korea .......................... 97-382

[51] Int. Cl.[7] .................................. A23F 1/02; F27D 1/18

[52] U.S. Cl. ............................................ 156/345; 432/250

[58] Field of Search ............................ 156/345; 432/250; 110/173, 176

[56] References Cited

U.S. PATENT DOCUMENTS 5,674,123 10/1997 Roberson, Jr. et al. .

FOREIGN PATENT DOCUMENTS 4-257244 9/1992 Japan .

*Primary Examiner*—Anthony J. Weier
*Attorney, Agent, or Firm*—Jones Volentine, LLP

[57] ABSTRACT

An apparatus for opening/closing a process chamber door of an oven for manufacturing a semiconductor device includes a boss formed at one side of an opening of the process chamber, a shaft which passes freely through the center of the boss, bearings attached to the process chamber and rotatably supporting the ends of the shaft, a driver for rotating the shaft in opposite directions over a predetermined angle, and a door that seals the opening, one side of the door being attached to the shaft so as to be moved when the shaft rotates. Alternatively, the present invention provides a pair of bearings disposed beside one side of an opening of the process chamber, a shaft whose ends are rotatably supported by the bearings, a bracket having one end fixed to the shaft, and another end fixed to the door. A driver also rotates the shaft over a predetermined angle that opens and closes the door.

10 Claims, 6 Drawing Sheets

APPARATUS FOR OPENING/CLOSING A PROCESS CHAMBER DOOR OF OVENS USED FOR MANUFACTURING SEMICONDUCTOR DEVICES

BACKGROUND OF THE INVENTION

1. Field of the Invention

The present invention relates to an apparatus for opening/closing process chamber doors of ovens used in the manufacture of semiconductor devices. More particularly, the invention relates to the apparatus for opening/closing the path through which a cassette passes in the oven where wafers are hard baked after being subjected to a wet etching process.

2. Discussion of the Related Art

Generally, semiconductor devices are fabricated using multiple repeated processes such as photolithography, etching, thin film formation, and hard baking processes that follow wet etching processes. FIGS. 1 and 2 show a conventional oven for performing the hard baking process. The baking process is performed in a process chamber 1 where multiple wafers 2 are loaded into a cassette 3, and the inside of which is heated to the desired temperature.

A ventilator 4 at the bottom of the process chamber 1 forces the inside air to circulate along an air flow path 5. The air is heated by means of a heater 6 in the air flow path 5, and therefore the temperature of the air is raised to the desired process temperature. A filter 7 at the top of the process chamber 1 removes foreign substances from the air before the air enters the inside of the chamber.

In addition, an opening 8 through which the cassette 3 is passed, penetrates the process chamber 1, and is sealed by a door 9. One end of the door 9 is connected to the process chamber 1 by a hinge 10, the other end having a handle 11 for opening/closing the door manually.

Such a manual door operating method results in reduced operating efficiency due to the user's direct operation of the door sealing the opening 8. Also, the wafer and its periphery are contaminated by particles resulting from the abrasion of the hinge 10, which is easily broken because of the weak connecting structure, thereby requiring the oven to be taken out of service for repairs. Additionally, the user risks burns when the door 9 is accidentally opened.

SUMMARY OF THE INVENTION

Accordingly, an object of the present invention is to provide an apparatus for opening/closing the process chamber door of an oven used in the manufacture of semiconductor devices, which substantially overcomes one or more of the problems, limitations, and disadvantages of the related art.

More specifically, an object of the present invention is to provide an apparatus for opening/closing the process chamber door of an oven used in the manufacture of semiconductor devices, which automatically operates the door to increase efficiency, minimize the contamination of the wafer with dust particles typically produced during the opening/closing of the door, and reduce the risk of personnel becoming accidentally burned.

To achieve these and other objects, the present invention provides a boss formed at one side of an opening of a process chamber; a shaft which passes through the boss; bearings attached to the process chamber, for supporting the ends of the shaft; a driving means for turning the shaft to desired positions; and a door, that seals the opening, and one side of which is attached to the shaft.

In another aspect, the present invention also provides a pair of bearings located at one side of an opening of a process chamber; a shaft supported at its ends by the bearings; a bracket having one end attached to the shaft and the other end attached to the door; and an actuator for turning the bracket over a predetermined angle in order to move the door and open/close the process chamber.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, in which.

DETAILED DESCRIPTION OF THE PREFERRED EMBODIMENTS

Reference will now be made in detail to the preferred embodiments of the present invention which are illustrated in the accompanying drawings.

Figure 1:
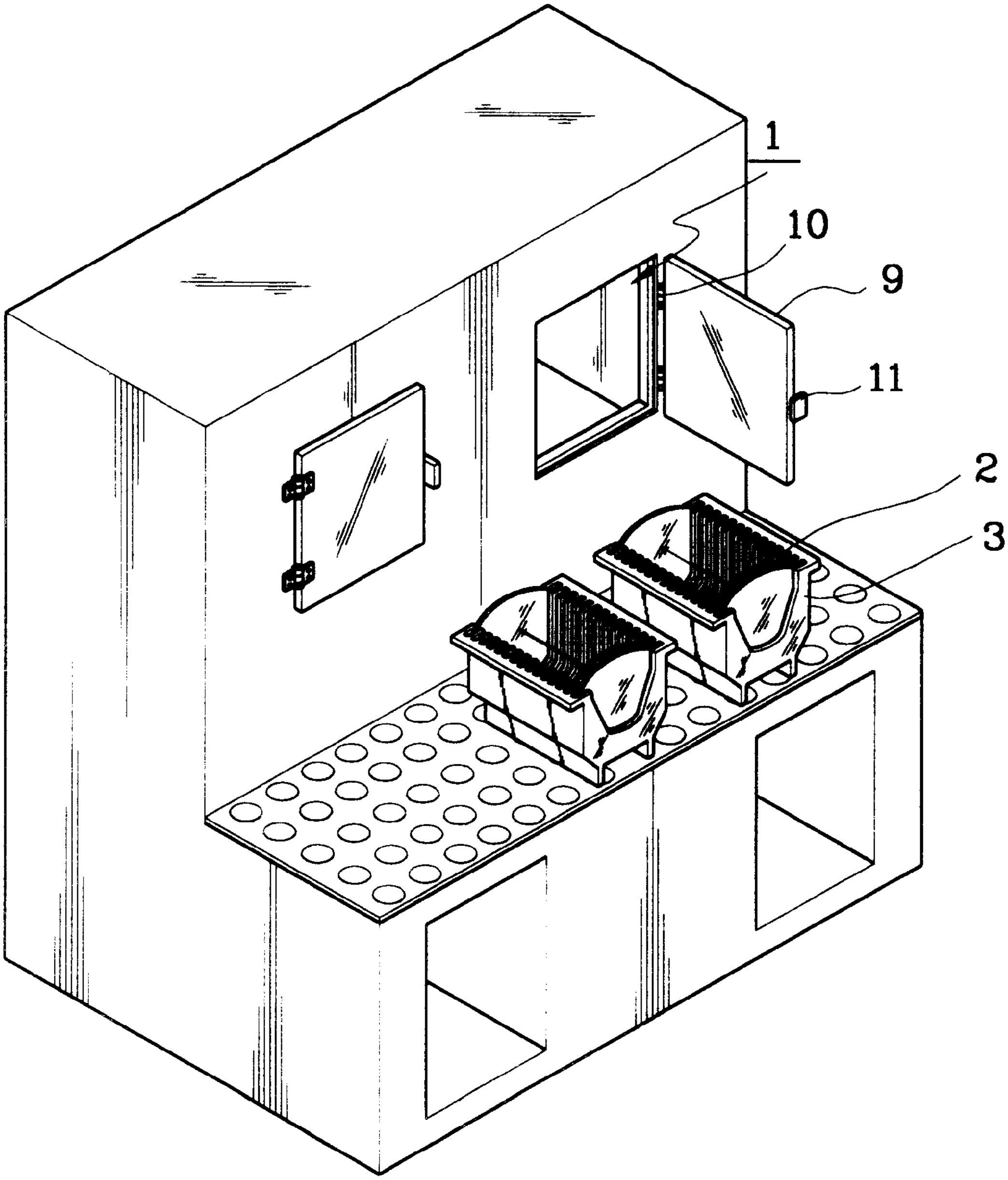
FIG. 1 (PRIOR ART)
FIG. 1 is a perspective view of a conventional oven.
Figure 2:
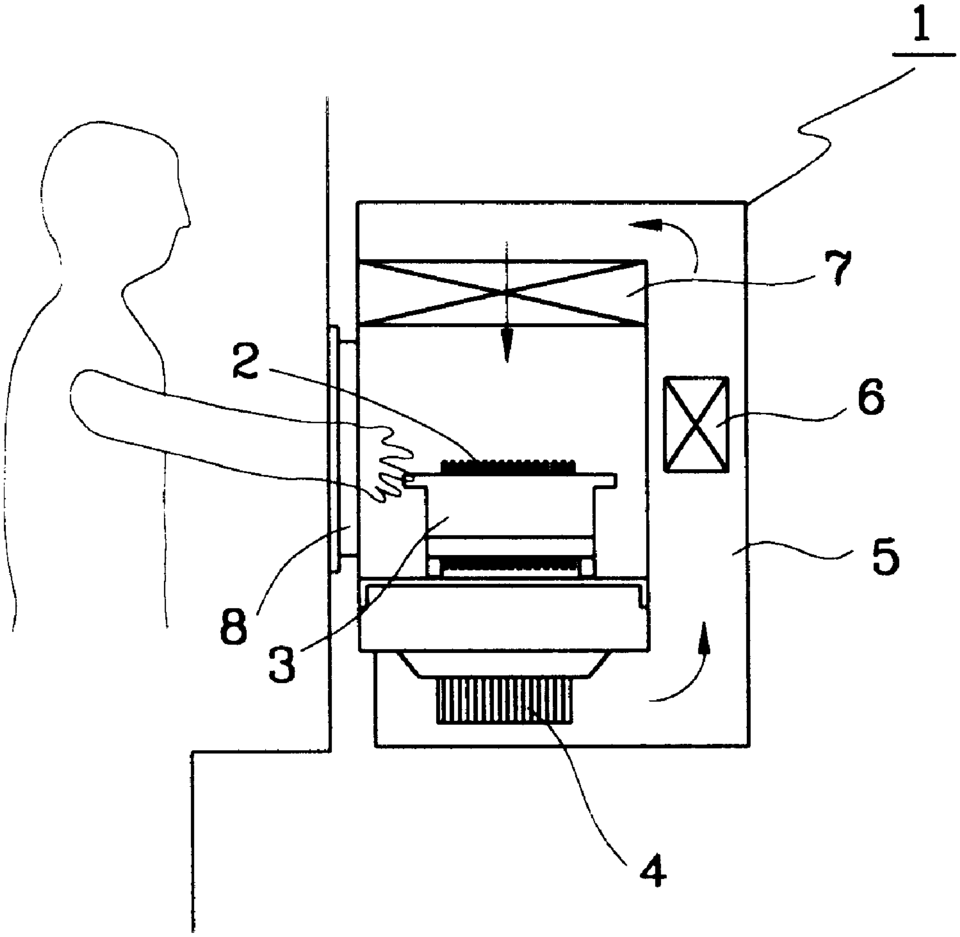
FIG. 2 (PRIOR ART)
FIG. 2 is a cross-sectional view of the inside of the conventional oven.
Figure 3:
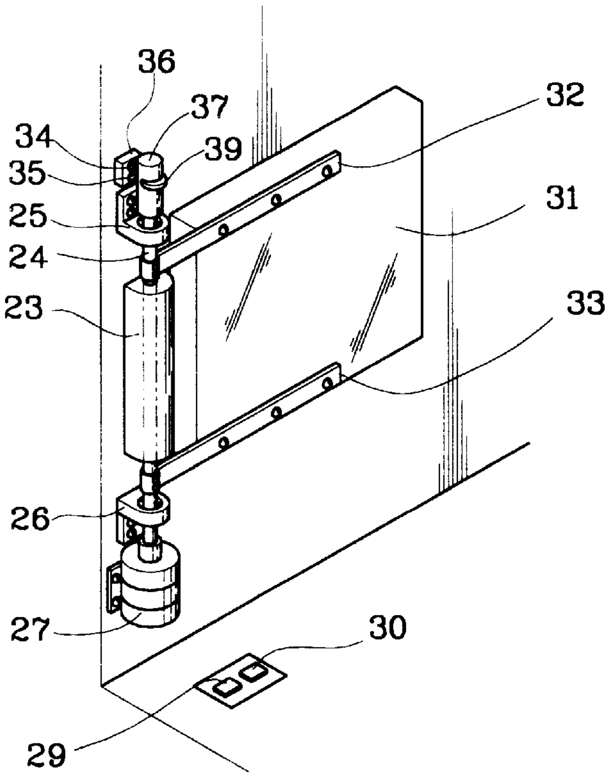
FIG. 3 is a perspective view of a first preferred embodiment of a process chamber door opening/closing apparatus according to the present invention.
Figure 4:
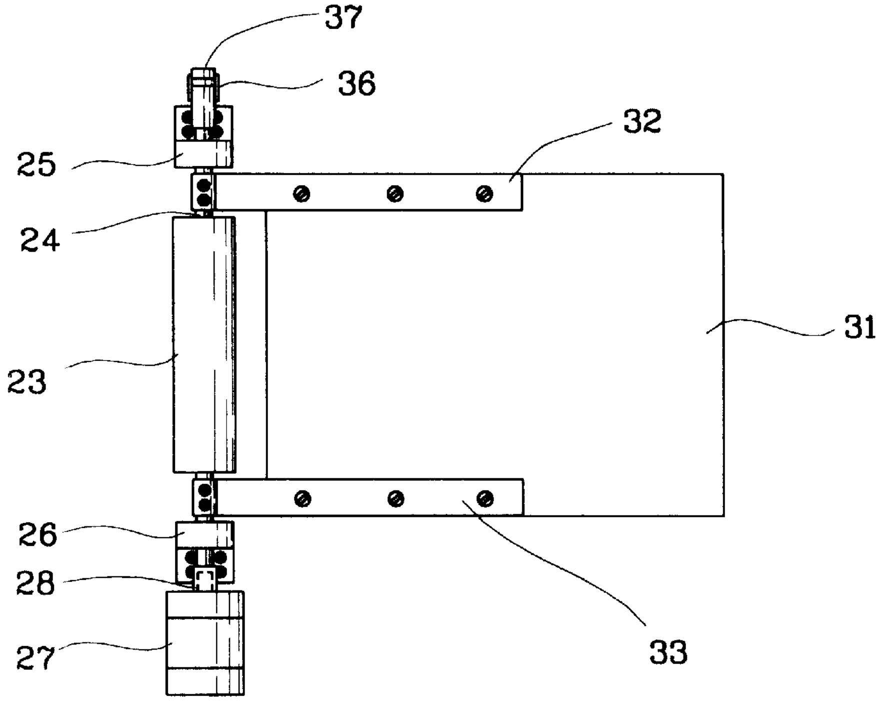
FIG. 4 is a front view of the first preferred embodiment of the process chamber door opening/closing apparatus according to the present invention.

FIGS. 3 and 4 show the first preferred embodiment of a process chamber door opening/closing apparatus for ovens used in the manufacture of semiconductor devices according to the present invention. A boss 23 is attached at one side of an opening 22 in a process chamber 21. A shaft 24 rotatably passes through the center of the boss 23, and both ends extend beyond the boss 23.

Bearings 25 and 26 are fitted to both ends of the shaft 24 for facilitating the rotation of the shaft 24. The output shaft 28 from a gear reduction motor 27 is connected to one end of the shaft 24 in order to rotate the shaft forward or reversely when the gear reduction motor 27 is operated. The gear reduction motor 27 is controlled by door opening/closing switches 29 and 30.

Figure 5A:
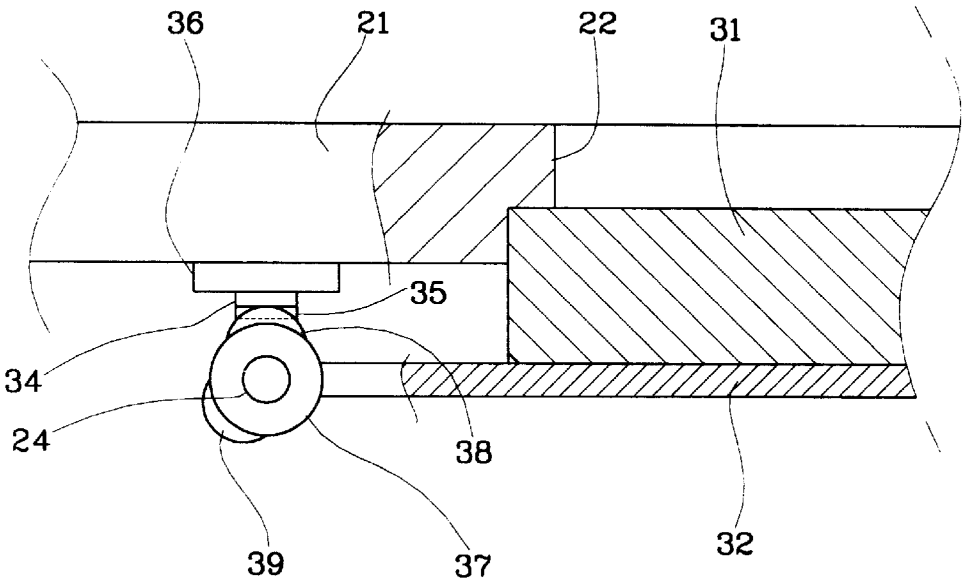
FIGS. 5A and 5B show the operation of the process chamber door opening/closing apparatus.

One end each of fixing bars 32 and 33 are fixed to ends of the shaft 24, respectively. The other end of each of bars 32 and 33 is fixed to the upper and lower portions of door 31 respectively, so that the shaft 24 is connected to the door 31 to open/close the opening 22 to the process chamber 21 (FIG. 5A). Accordingly, the shaft 24 turns with the gear reduction motor 27 so that the door 31 opens/closes the process chamber 21.

Figure 5B:
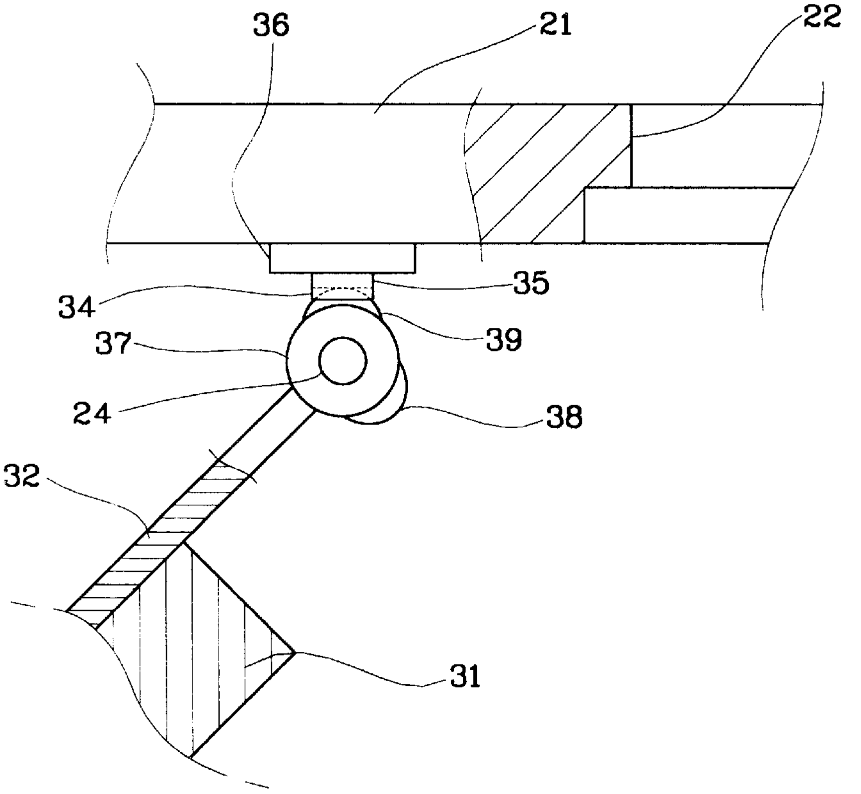

The present invention additionally has a control means to establish the opened/closed positions of the door 31. As shown in FIGS. 5A and 5B, this control means includes a limit switch 36 having a first upper contact 34 which is depressed to stop the gear reduction motor 27 when the door 31 is tightly closed, and a second lower contact 35 which is depressed to stop the gear reduction motor 27 when the door 31 is fully open. The first and second contacts 34 and 35 of the limit switch 36 are actuated by a cam 37 attached to the shaft 24. The cam 37 includes first and second lobes 38 and 39 which engage the first and second contacts 34 and 35, respectively, in order to operate them. The first lobe 38 is thus vertically spaced apart from the second lobe 39 in order to engage the respective contacts 34, 35.

The opening/closing angle is determined by the position of the first and second lobes 38 and 39 for operating the first and second contacts 34 and 35. It is preferable to select the angle in the range of 90~180°, and therefore the first and second lobes 38 and 39 are separated by an angle of 135°. As a result, the opening/closing angle of the door 31 is set at 135° in this preferred embodiment of the present invention.

The following description relates to the operation of the door opening/closing apparatus having the above-described structure.

As shown in FIGS. 3, 4 and 5A, the door 31 closes the opening 22 to the process chamber 21. The first lobe 38 of the cam 37 attached to shaft 24 closes the first upper contact 34 of limit switch 36 so that the gear reduction motor 27 stops when the door 31 is closed.

If the user wants to uncover the opening 22, he operates the door opening switch 29 to drive the gear reduction motor 27. As shown in FIG. 5B, the shaft 24 turns to move the door 31 connected to the shaft 24 with the fixing bars 32 and 33, so that the door 31 is automatically opened. Simultaneously, the second lobe 39 of cam 37, attached to the shaft, closes the second lower contact 35 of the limit switch 36. Accordingly, the gear reduction motor 27 stops, and then the door 31 remains in the open position after having been moved through a predetermined angular rotation.

If the user wants to thereafter cover the opening 22, he operates the door closing switch 30 to drive the gear reduction motor 27. The shaft 24 turns in the reverse direction, which is attached to the door 31 by the fixing bars 32 and 33, so that the door 31 automatically covers the opening 22. Simultaneously, the first lobe 38 of the cam 37, which is attached to the shaft 24, again closes the first contact 34 of the limit switch 36. Accordingly, the gear reduction motor 27 stops, and the door 31 remains in the closed position.

As stated above, the opening/closing of the door 31 is automatically performed. When the door 31 is opened/closed, the shaft 24 is rotatably supported by bearings 25 and 26. This results in a smooth operation of the shaft 24, thereby minimizing the particles caused by abrasion during rotation.

Figure 6:
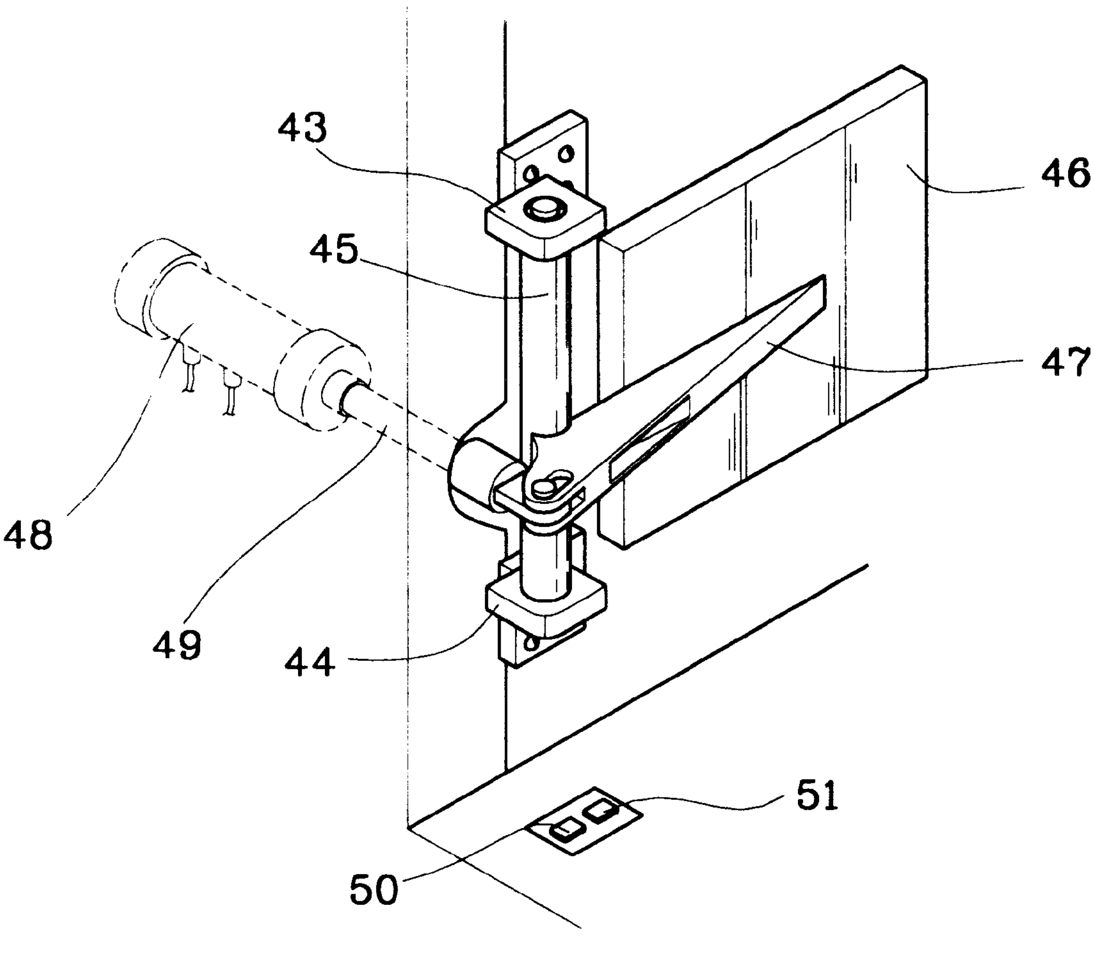
FIG. 6 is a perspective view of a second preferred embodiment of a process chamber door opening/closing apparatus according to the present invention.
Figure 7A:
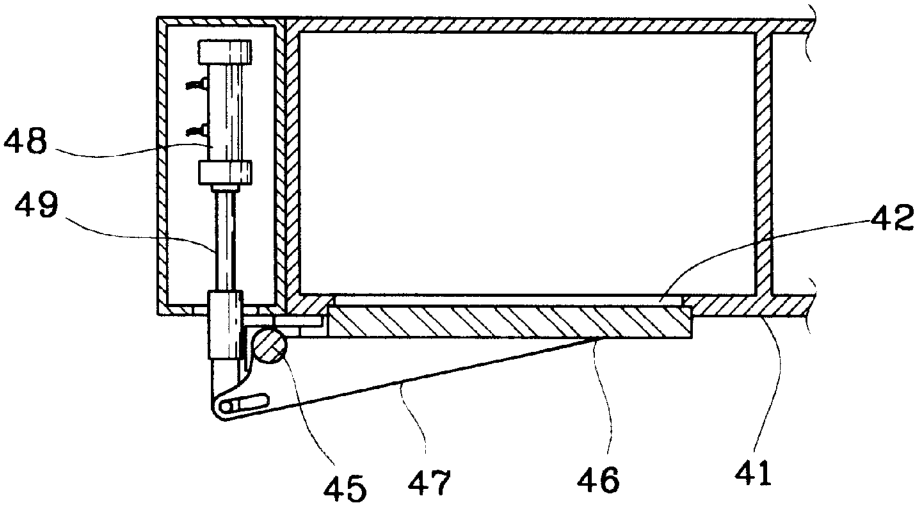
FIGS. 7A and 7B show the operation of the second preferred embodiment of the process chamber door opening/closing apparatus according to the present invention.
Figure 7B:
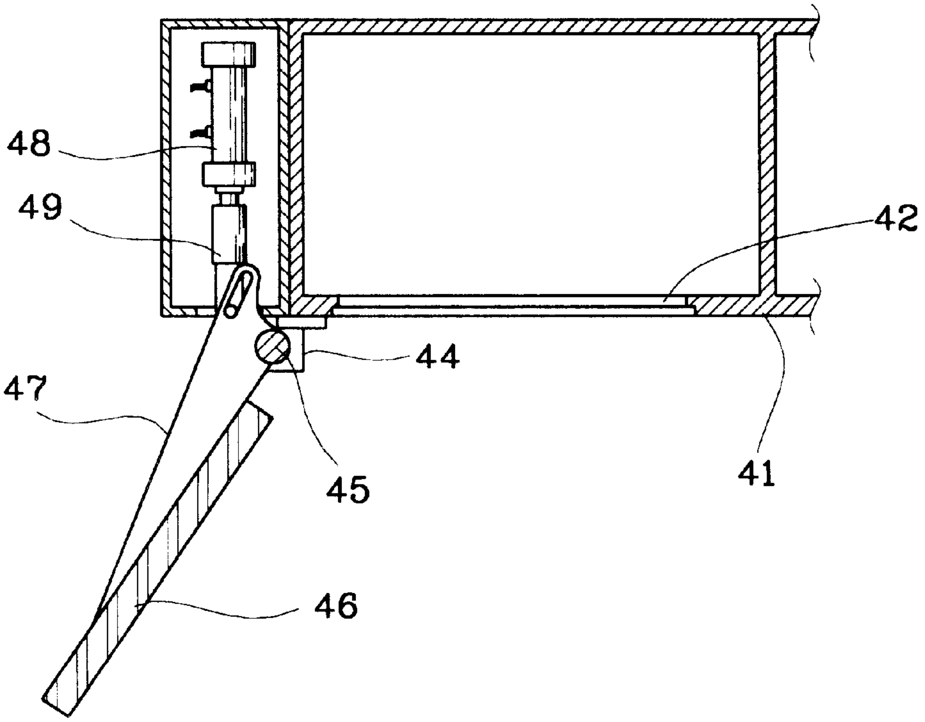

FIGS. 6, 7A and 7B show the second preferred embodiment of a process chamber door opening/closing apparatus for ovens used in the manufacture of semiconductor devices according to the present invention. Bearings 43 and 44 are located at the upper and lower edges of one side of an opening 42 in the process chamber 41, and rotatably support the ends of a shaft 45.

The shaft 45 is attached to door 46 and a bracket 47. One end of the bracket 47 is attached to the shaft 45 in order to turn with it, and the other end to the door 46.

The rod 49 of a pneumatic actuator cylinder 48 is connected to one end of the bracket 47. The bracket 47 turns with the shaft 45 by a predetermined angle by rectilinear motion of the rod 49, and the pneumatic actuator cylinder 48 is controlled by the operation of door opening/closing switches 50 and 51. Accordingly, the shaft 45 and the bracket 47 are moved by the operation of the pneumatic actuator rod 49, thereby moving the door, while the pneumatic cylinder 48 is driven. Because the door 46 is interlocked with the shaft 45, the opening 42 of the process chamber 41 becomes exposed/covered.

The open/closed positions of the door 46 are determined by the stroke of the rod 49 of the pneumatic actuator cylinder 48. The stroke of the pneumatic actuator cylinder 48 is set by a sensor (not illustrated) which is integral with the pneumatic actuator cylinder 48. It is preferable to select a stroke of the pneumatic rod 49 so that the opening/closing angle of the door 46 is in the range of 90 to 180°.

The following description relates to the operation of the door opening/closing apparatus having the above-described structure.

As shown in FIGS. 7A and 7B, the door 46 covers the opening 42 of the process chamber 41. The rod 49 of the pneumatic actuator cylinder 48 moves forward so that the door 46 closes.

If the user wants to uncover the opening 42, which is sealed by the door 46, he operates the door opening switch 50 to drive the pneumatic actuator cylinder 48. The pneumatic actuator rod 49 moves backward to open the door 46. One end of the bracket 47 is pulled by the pneumatic actuator rod 49 so that the bracket 47 and the shaft 45 turn. Simultaneously, the door 46 connected to the bracket 47, moves with the shaft to uncover the opening 42.

If the user wants to thereafter cover the opening 42, he operates the door closing switch 51 to drive the pneumatic actuator cylinder 48. The pneumatic actuator rod 49 again moves forward to close the door 46. One end of the bracket 47 is pushed by the pneumatic actuator rod 49, turning the shaft 45. Simultaneously, the door 46 connected to the bracket 47 moves and then the opening 42 is automatically covered by the door 46.

As stated above, the opening/closing of the door 46 is automatically performed, thereby enhancing operating efficiency. When the door 46 is opened/closed, the shaft 45 turns smoothly on bearings 43 and 44. This results in the smooth operation of the door which minimizes particles produced by abrasion, thereby improving yield. Because the user need not open/close the door manually, the chances of being burned are reduced.

It will be apparent to those skilled in the art that various modifications and variations can be made to the apparatus for opening/closing process chamber doors of an oven used in the manufacture of semiconductor devices without departing from the spirit or scope of the invention. Thus, all such modifications and variations that come within the scope of the appended claims are seen to be within the true spirit and scope of the present invention.

What is claimed is:

1. An apparatus for opening/closing a process chamber door of an oven used in manufacturing semiconductor devices, said apparatus comprising:

a boss disposed at one side of an opening of the process chamber;

a shaft passing freely through the boss and extending beyond opposite ends of the boss;

bearings attached to the process chamber and rotatably supporting said ends of the shaft;

driving means for rotating the shaft in forward and reverse directions over a predetermined angle; and a door attached to the shaft so as to be movable therewith, said door covering the opening of the process chamber when in a first position and exposing the opening when in a second position.

2. The apparatus as claimed in claim 1, further comprising control means for establishing said positions of the door.

3. The apparatus as claimed in claim 2, wherein said control means comprises a limit switch having a first contact dedicated to stop the driving means when said door is in said first position, a second contact dedicated to stop the driving means when said door is in said second position, and a cam coupled to said shaft and having first and second lobes which engage said first and second contacts in order to selectively operate the first and second contacts in accordance with the direction in which the shaft rotates.

4. The apparatus as claimed in claim 3, wherein the first and second lobes are separated circumferentially by an angle between 90 and 180°.

5. The apparatus as claimed in claim 4, wherein the first and second lobes are separated by a vertical distance approximately equal to a vertical distance separating said first and second contacts.

6. The apparatus as claimed in claim 1, wherein the driving means comprises a gear reduction motor which is coupled to one of said ends of the shaft.

7. The apparatus as claimed in claim 1, further comprising upper and lower fixing bars having respective first ends fixed to said shaft, and respective second ends fixed to said door to connect the shaft and the door.

8. An apparatus for opening/closing a process chamber door of an oven used in manufacturing semiconductor devices, said apparatus comprising:

a boss disposed at one side of an opening of the process chamber;

a shaft passing freely through the boss;

a door supported by said shaft so as to be rotatable, said door covering the opening of the process chamber when in a first position and exposing the opening when in a second position;

driving means for rotating said door; and a limit switch having a first contact dedicated to stop the driving means when said door is in said first position, a second contact dedicated to stop the driving means when said door is in said second position, and a cam coupled to said shaft and having first and second lobes which engage said first and second contacts in order to selectively operate the first and second contacts in accordance with the direction in which the shaft rotates.

9. The apparatus as claimed in claim 8, wherein the first and second lobes are separated circumferentially by an angle between 90 and 180°.

10. The apparatus as claimed in claim 9, wherein the first and second lobes are separated by a vertical distance approximately equal to a vertical distance separating said first and second contacts.

* * * * *